(12) United States Patent
Yoshimoto et al.

(10) Patent No.: US 7,455,792 B2
(45) Date of Patent: Nov. 25, 2008

(54) ORGANIC CONDUCTIVE MATERIAL AND CONDUCTIVE VARNISH

(75) Inventors: Takuji Yoshimoto, Funabashi (JP); Hiroyoshi Fukuro, Funabashi (JP); Hitoshi Furusho, Tokyo (JP); Akira Yanagimoto, Tokyo (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 448 days.

(21) Appl. No.: 10/505,127

(22) PCT Filed: Feb. 19, 2003

(86) PCT No.: PCT/JP03/01796
§ 371 (c)(1),
(2), (4) Date: Aug. 19, 2004

(87) PCT Pub. No.: WO03/071559
PCT Pub. Date: Aug. 28, 2003

(65) Prior Publication Data
US 2005/0082514 A1   Apr. 21, 2005

(30) Foreign Application Priority Data
Feb. 20, 2002  (JP)  .............. 2002-043144

(51) Int. Cl.
H01B 1/00   (2006.01)
C08G 73/00  (2006.01)
H01L 29/08  (2006.01)

(52) U.S. Cl. .................... 252/500; 528/422; 257/40

(58) Field of Classification Search ............... 252/500; 528/422; 427/77; 257/40
See application file for complete search history.

(56) References Cited

U.S. PATENT DOCUMENTS 4,356,429 A   10/1982  Tang
(Continued)

FOREIGN PATENT DOCUMENTS

EP   1 156 072 A1   11/2001
(Continued)

OTHER PUBLICATIONS

Tang et al., Appl. Phys. Lett. 51 Sep. 1987 p. 913 to 915.
(Continued)

*Primary Examiner*—Mark Kopec
*Assistant Examiner*—Jaison P Thomas
(74) *Attorney, Agent, or Firm*—Birch, Stewart, Kolasch & Birch, LLP

(57) ABSTRACT

Disclosed herein are an organic conductive material and a conductive varnish containing it in an amount of 1 to 80 wt %. The organic conductive material comprises an oligoaniline derivative represented by the formula (1) in which quinoimine as an oxidant formed at the time of synthesis is reduced by a reducing agent and a salt is formed with an electron accepting dopant.

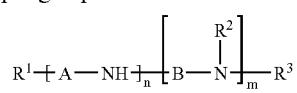

(1)

(where $R^1$ to $R^3$ independently denote a hydrogen atom, unsubstituted or substituted monovalent hydrocarbon group, organoxy group, or acyl group; A and B independently denote a divalent group represented by the formula (2) or (3) below;

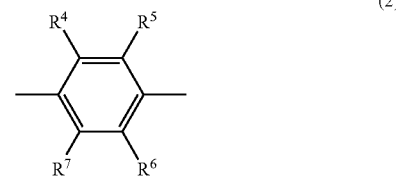

(2)

(3)

where, $R^4$ to $R^{11}$ independently denote a hydrogen atom, hydroxyl group, unsubstituted or substituted monovalent hydrocarbon group, organoxy group, acyl group, or sulfonic group; and m and n independently denote a positive number equal to or larger than 1 such that m+n≦20.)

3 Claims, 2 Drawing Sheets

U.S. PATENT DOCUMENTS

| | | | |
|---|---|---|---|
| 5,237,023 A | 8/1993 | Oka | |
| 5,281,363 A | 1/1994 | Shacklette et al. | |
| 5,378,403 A * | 1/1995 | Shacklette | 252/500 |
| 5,422,423 A | 6/1995 | Shacklette et al. | |
| 6,099,756 A | 8/2000 | Angelopoulos et al. | |
| 6,140,462 A | 10/2000 | Angelopoulos et al. | |
| 6,160,177 A | 12/2000 | MacDiarmid et al. | |
| 6,239,251 B1 * | 5/2001 | Wei et al. | 528/422 |
| 6,285,124 B1 | 9/2001 | Nagayama et al. | |
| 6,497,969 B2 * | 12/2002 | Kim et al. | 428/690 |
| 6,632,544 B1 * | 10/2003 | Kido et al. | 428/690 |
| 6,821,648 B2 * | 11/2004 | Kido et al. | 428/690 |
| 7,341,678 B2 * | 3/2008 | Kato et al. | 252/500 |
| 2001/0011867 A1 | 8/2001 | Nagayama et al. | |
| 2003/0161968 A1 * | 8/2003 | Wang et al. | 427/569 |
| 2004/0241421 A1 * | 12/2004 | Ootsuka et al. | 428/323 |
| 2006/0115652 A1 * | 6/2006 | Yoshimoto et al. | 428/411.1 |
| 2007/0187672 A1 * | 8/2007 | Ono et al. | 257/40 |

FOREIGN PATENT DOCUMENTS

| | | |
|---|---|---|
| EP | 1 248 497 A1 | 10/2002 |
| JP | 3-111425 A | 5/1991 |
| JP | 9-227675 A | 9/1997 |
| JP | 11-504982 A | 5/1999 |
| JP | 11-506497 A | 6/1999 |
| JP | 11-195491 A | 7/1999 |
| JP | 11-322923 A | 11/1999 |
| JP | 2001-160493 A | 6/2001 |
| JP | 2002-151272 A | 5/2002 |
| WO | WO-93/24554 A1 | 12/1993 |

OTHER PUBLICATIONS

Adachi et al., Jpn. J. Appl. Phys. vol. 27, No. 2 Feb. 1988 L269, to L271.

Adachi et al., Jpn. J. Appl. Phys. vol. 27, No. 4 Apr. 1988 L713, L715.

J. H. Burroughes et al., Nature vol. 347 Oct. 11, 1990, p. 539 to 541.

Yang et al., Appl. Phys. Lett. 64, Mar. 7, 1994 p. 1245 to 1247.

* cited by examiner

ORGANIC CONDUCTIVE MATERIAL AND CONDUCTIVE VARNISH

This application is a National Stage entry of PCT/JP03/01796 filed Feb. 19, 2003 and claims priority of JP 2002-043144 filed Feb. 20, 2002, the entire contents of which are hereby incorporated by reference.

TECHNICAL FIELD

The present invention relates to an organic conductive material and a conductive varnish containing it. The organic conductive material is a salt of an oligoaniline derivative (which is a π-conjugated organic compound) with an acid and is highly soluble in water or organic solvents. The conductive varnish is a solution containing the organic conductive material dissolved or dispersed therein, which is capable of application by dip coating or spin coating. The conductive varnish containing the organic conductive material will be used to form organic conductive layers varying in thickness, such as a charge-injection auxiliary layer for organic electroluminescence (EL for short hereinafter) elements and an organic electrode on capacitor dielectrics or a capacitor electrode.

BACKGROUND ART

There has recently been proposed by Eastman Kodak a new organic EL element, particularly that of low molecular-weight type (OLED for short hereinafter), which realizes high luminance with a low driving voltage owing to its improved structure, with electrodes holding between them a charge transporting layer and an emitting layer formed by vapor deposition. (See Appl. Phys. Lett. 51 (1987) 913 and U.S. Pat. No. 4,356,429.) The ensuing active researches have led to the development of an element of three-layer type in which the emitting function is separated from the carrier transportation. Thus, the OLED element has entered the stage of practical use. (See Jpn. J. Appl. Phys. 27 (1988) L269, L713.) Moreover, a new EL element with a polymeric emitting material (PLED for short hereinafter) has been found in Cambridge College. (See Nature, 347 (1990), p. 539.) In addition, it has been found that the PLED has greatly improved characteristic properties if it is provided with a conductive organic material formed on the electrode. (See Appl. Phys. Lett. 64 (1994), p. 1245.) Now, such new PLED elements are comparable in characteristic properties to old OLED elements.

Conductive polymers are also finding use in the technology relating to capacitors. For example, a thin film of conductive polymer formed by electrolytic polymerization is gradually replacing manganese oxide interposed between the dielectric layer and the electrode for solution of problems with contact resistance.

Conductive polymers to be applied to such electronic devices are required to have a high solubility in solvents so that they provide a smooth thin film and infiltrate into minute gaps.

The present applicant invented a charge transporting varnish prepared from a low-molecular weight oligoaniline dissolved in an organic solvent and also found that this varnish gives rise to a hole injection layer which greatly improves the characteristic properties of EL elements. (See Japanese Patent Laid-open No. 2002-151272.)

Unfortunately, the aniline derivative has the quinoimine structure in its oxidized state, which remarkably impairs its solubility in solvents but contributes to its conductivity. For example, polyaniline polymerized by chemical oxidation has a very low solubility owing to its quinoimine structure. One way to increase solubility is to reduce the quinoimine structure with hydrazine. However, if a salt is formed by doping, the resulting product decreases in solubility. The problem with solubility remains unsolved.

DISCLOSURE OF INVENTION

It is an object of the present invention to provide an organic conductive material highly soluble in water and organic solvents and a conductive varnish containing it. It is another object of the present invention to provide an organic EL element made with the varnish.

In order to achieve the above-mentioned object, the present inventors carried out an extensive research, which led to the finding that an aniline oligomer in reduced form has an extremely high solubility if it is doped with an acid. For example, if an oligoaniline derivative in reduced form is doped with a sulfonic acid derivative represented by the formula (4)

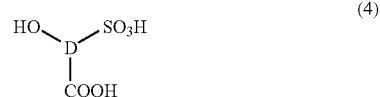

for salt formation, then the resulting salt is highly soluble in N,N-dimethylformamide, which is an organic solvent. A solution of this salt in N,N-dimethylformamide is useful as a conductive varnish which stably contains as much solids (salt) as 70 wt %. Being poor in conductivity, the thin film formed from the varnish by spin coating or dip coating is oxidized by baking in the presence of oxygen so that the quinoimine structure is formed for improvement in conductivity.

The present invention, which is based on the above-mentioned finding, provides an organic conductive material defined below, a conductive varnish containing it, a conductive thin film, and an organic EL element made with it.

[1] An organic conductive material which comprises an oligoaniline derivative represented by the formula (1) in which quinoimine as an oxidant formed at the time of synthesis is reduced by a reducing agent and a salt is formed with an electron accepting dopant.

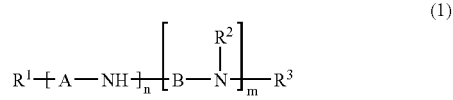

(where $R^1$ to $R^3$ independently denote a hydrogen atom, unsubstituted or substituted monovalent hydrocarbon group, organoxy group, or acyl group; A and B independently denote a divalent group represented by the formula (2) or (3) below;

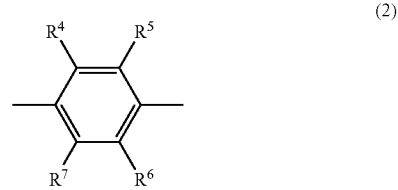

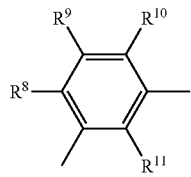

where, $R^4$ to $R^{11}$ independently denote a hydrogen atom, hydroxyl group, unsubstituted or substituted monovalent hydrocarbon group, organoxy group, acyl group, or sulfonic group; and m and n independently denote a positive number equal to or larger than 1 such that m+n≦20.)

[2] An organic conductive material as defined in [1] above, wherein $R^1$ and $R^2$ in the formula (1) denote a hydrogen atom, $C_{1-20}$ alkyl group, or $C_{1-20}$ alkoxy group.

[3] An organic conductive material as defined in [1] or [2] above, wherein $R^3$ in the formula (1) denotes a hydrogen atom or aryl group.

[4] An organic conductive material as defined in any of [1] to [3] above, wherein the dopant is a sulfonic acid derivative represented by the formula (4)

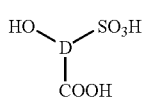

(where D denotes a benzene ring, naphthalene ring, anthracene ring, phenanthrene ring, or heterocycle.)

[5] A conductive varnish which comprises the organic conductive material defined in any of [1] to [4] defined above in an amount of 1 to 80 wt %.

[6] A conductive thin film formed from the conductive varnish defined in [5] above.

[7] An organic EL element having the conductive thin film defined in [6] above.

BEST MODE FOR CARRYING OUT THE INVENTION

Figure 1:
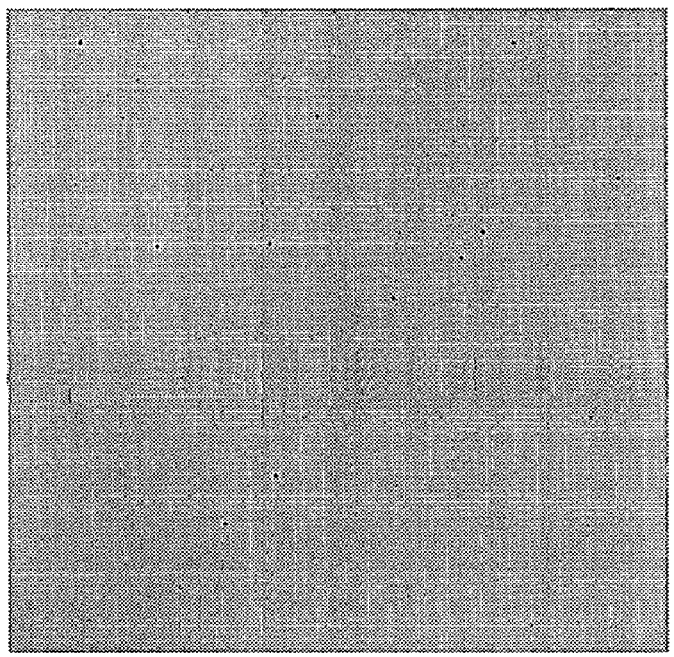
FIG. 1 is a confocal laser microphotograph (×20) of the coating surface obtained in Example 2.

The organic conductive material according to the present invention is based on an oligoaniline derivative represented by the formula (1) below.

(where $R^1$ to $R^3$ independently denote a hydrogen atom, unsubstituted or substituted monovalent hydrocarbon group, organoxy group, or acyl group; A and B independently denote a divalent group represented by the formula (2) or (3) below;

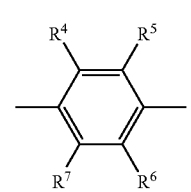

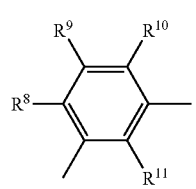

where $R^4$ to $R^{11}$ independently denote a hydrogen atom, hydroxyl group, unsubstituted or substituted monovalent hydrocarbon group, organoxy group, acyl group, or sulfonic group; and m and n independently denote a positive number equal to or larger than 1 such that m+n≦20.)

According to the present invention, the oligoaniline derivative represented by the formula (1) may be synthesized by any method without specific restrictions. A common method is by dehydration condensation reaction between an aromatic amine and a phenol or by reaction between an aromatic amine and an aromatic amine hydrochloride in a molten state.

The oligoaniline derivative used in the present invention has substitunts $R^1$ to $R^3$, which independently denote a hydrogen atom, unsubstituted or substituted monovalent hydrocarbon group, organoxy group, or acyl group.

The monovalent hydrocarbon group and organoxy group should preferably be those which have a carbon number of 1 to 20. The acyl group should preferably be those which have a carbon number of 2 to 20. Examples of the monovalent hydrocarbon group include alkyl groups (such as methyl group, ethyl group, propyl group, butyl group, t-butyl group, hexyl group, octyl group, and decyl group), cycloalkyl groups (such as cyclopentyl group and cyclohexyl group), bicycloalkyl groups (such as bicyclohexyl group), alkenyl groups (such as vinyl group, 1-propenyl group, 2-propenyl group, isopropenyl group, 1-methyl-2-propenyl group, 1- or 2- or 3-butenyl group, and hexenyl group), aryl groups (such as phenyl group, xylyl group, tolyl group, biphenyl group, and naphthyl group), and aralkyl groups (such as benzyl group, phenylethyl group, and phenylcyclohexyl group). These monovalent hydrocarbon groups may have their hydrogen atoms partly or entirely replaced by halogen atoms, hydroxyl groups, or alkoxy groups.

Examples of the organoxy group include alkoxy groups, alkenyloxy groups, and aryloxy groups. The alkyl groups, alkenyl groups, and aryl groups in them are the same as those listed above.

The acyl group should preferably be the one which has a carbon number of 2 to 10. It includes, for example, acetyl group, propionyl group, butylyl group, isobutylyl group, and benzoyl group.

Preferred examples of $R^1$ and $R^2$ include a hydrogen atom, alkyl group or alkoxy group having a carbon number of 1 to 20, preferably 1 to 4, and phenyl group, cyclohexyl group, cyclopentyl group, biphenyl group, bicyclohexyl group, and phenylcyclohexyl group, which may have substituent, such as $C_{1-4}$ alkyl groups and alkoxy groups. Of these examples, alkyl groups, alkoxy groups, and $C_{2-4}$ acyl groups are particularly preferable. Preferred examples of $R^3$ include a hydrogen atom and an aryl group (particularly a phenyl group).

The substituents $R^4$ to $R^{11}$ are independently a hydrogen atom, hydroxyl group, unsubstituted or substituted monovalent hydrocarbon group, organoxy group, acyl group, or sulfonic group. Preferred examples of the unsubstituted or substituted monovalent hydrocarbon group and organoxy group include those which have a carbon number of 1 to 20. Preferred examples of the acyl group include those which have a carbon number of 2 to 20. They are the same as those which are explained for $R^1$.

Preferred examples of the substituents $R^4$ to $R^{11}$ include a hydrogen atom, alkyl group, alkoxy group, alkoxyalkyl group, alkenyl group, acyl group, sulfonic group, and hydroxyl group. Additional examples include a phenyl group, cyclohexyl group, cyclopentyl group, biphenyl group, bicyclohexyl group, and phenylcyclohexyl group, each of which may have a $C_{1-4}$ alkyl group or alkoxy group as a substituent.

More preferred examples of $R^4$ to $R^{11}$ include a hydrogen atom, $C_{1-20}$ alkyl group, $C_{1-20}$ alkoxy group, alkoxyalkyl group composed of $C_{1-20}$ alkoxy group and $C_{1-20}$ alkyl group, $C_{2-4}$ alkenyl group, $C_{2-4}$ acyl group, benzoyl group, sulfonic group, and hydroxyl group. Additional examples include a phenyl group, cyclohexyl group, cyclopentyl group, biphenyl group, bicyclohexyl group, and phenylcyclohexyl group, each of which may have a $C_{1-4}$ alkyl group or $C_{1-4}$ alkoxy group as a substituent. Particularly preferred examples include a hydrogen atom, $C_{1-4}$ alkyl group, $C_{1-4}$ alkoxy group, alkoxyalkyl group composed of $C_{1-4}$ alkoxy group and $C_{1-4}$ alkyl group, vinyl group, 2-propenyl group, acetyl group, benzoyl group, sulfonic group, and hydroxyl group. Additional examples include a phenyl group, cyclohexyl group, biphenyl group, bicyclohexyl group, and phenylcyclohexyl group, each of which may have a $C_{1-4}$ alkyl group or $C_{1-4}$ alkoxy group as a substituent.

The subscripts m and n for the oligoaniline unit are independently a positive number of 1 or above. The sum of m+n should preferably be no larger than 20 for good solubility in solvents. It should be no larger than 10, particularly no larger than 5, if the varnish is to have a concentration equal to or higher than 20 wt %.

According to the present invention, the oligoaniline derivative prepared as mentioned above contains quinoimine as an oxidant which is formed at the time of synthesis, and this quinoimine is reduced by a reducing agent.

In other words, the aniline oligomer which has been synthesized is washed with organic solvents (such as toluene and ether sequentially) and then dried to give silvery crystals. The crystals undergo reduction as follows for improvement in solubility. The procedure for reduction is not specifically restricted. The crystals are dissolved in an organic solvent (such as dioxane which is compatible with the crystals), and the resulting solution is given a reducing agent, such as hydrazine. With the atmosphere in the reaction system replaced by an inert gas such as nitrogen, the crystals are dissolved with heating under refluxing. The resulting solution is given an organic solvent (such as toluene which is incompatible with the crystals) for precipitation. The precipitates are dissolved in an organic solvent (such as dioxane which is compatible with the crystals) with heating under refluxing, and the resulting solution is filtered. The filtrate is allowed to separate solids, and the separated solids are recrystallized. In this way, there is obtained the desired oligoaniline derivative (in the form of white crystals) to be used in the present invention.

The reducing agent used for reduction mentioned above is hydrazine or the like. It should be used in an amount of 0.1-10 parts by weight, particularly 0.5-2 parts by weight, for 100 parts by weight of the oligoaniline derivative to be purified. Examples of the compatible organic solvents include dioxane, tetrahydrofuran, N,N-dimethylformamide, N,N-dimethylacetamide, and N-methylpyrrolidone. Examples of the incompatible organic solvents include toluene, ether, xylene, benzene, chlorobenzene, dichlorobenzene, dichloromethane, dichloroethane, chloroform, hexane, and heptane.

According to the present invention, the oligoaniline derivative represented by the formula (1) shown above is obtained by the procedure mentioned above. Subsequently, a salt is formed by reaction with an electron accepting dopant. The acid which forms a dope (salt) with the dopant should preferably be a sulfonic acid derivative represented by the formula (4)

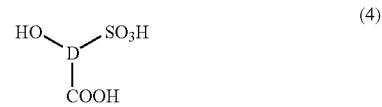

(4)

(where D denotes a benzene ring, naphthalene ring, anthracene ring, phenanthrene ring, or heterocycle) which easily brings about intermolecular mutual reactions. Examples of the dopant include sulfosalicylic acid derivatives. The dopant should be added in such an amount that the number of dopant molecules is no more than one, preferably 0.2 to 1, for one nitrogen atom in the oligoaniline derivative, depending on the molecular weigh of the oligoaniline derivative.

The oligoaniline derivative is dissolved in a solvent to give the varnish. The solvent used for this purpose is not specifically restricted so long as it dissolves the oligoaniline derivative. Examples of the solvent include water and organic solvents (such as N-methylpyrrolidone, N,N-dimethylacetamide, and N,N-dimethylformamide). These solvents may be used alone or in combination with one another.

The dopant may be added in any manner which is not specifically restricted. One procedure may consist of the following steps. The oligoaniline derivative is added to a solvent (such as DMF) under a stream of inert gas (such as nitrogen) for complete dissolution. The dopant is dissolved in a solvent (such as DMF). The amount of the dopant is determined according to the specific molar ratio of the dopant to the amount of nitrogen atoms contained in the oligoaniline derivative. The solution of the dopant is slowly added to the solution of the oligoaniline derivative. In this way there is readily obtained a solution of doped oligoaniline. Doping may be accelerated by heating.

The above-mentioned solvent capable of uniformly dissolving the oligoaniline derivative may be mixed with a solvent which hardly dissolves the oligoaniline derivative when used alone. Examples of such a solvent include ethyl cellosolve, butyl cellosolve, ethylcarbitol, butyl carbitol, ethylcarbitol acetate, and ethylene glycol.

Incidentally, the concentration of the oligoaniline derivative in the solution may be adjusted within the range of 1-80 wt %, particularly 1-50 wt %.

It is possible to form a thin film of the oligoaniline derivative on a substrate by applying the solution of the oligoaniline derivative onto a substrate and heating the coated solution to evaporate the solvent. The heating temperature is usually 80-200° C., which is high enough for solvent evaporation.

Coating to form the thin film of the oligoaniline derivative is accomplished by dip coating, spin coating, transfer printing, roll coating, or brushing.

Incidentally, the thus obtained thin film should be thoroughly baked in the presence of oxygen so as to form the quinoimine structure which contributes to improved conductivity.

The conductive thin film to be obtained by coating and ensuing evaporation is not specifically restricted in thickness. However, a thickness ranging from 5 to 200 nm is desirable in the case where the thin film is used as the charge injection layer in an organic EL element. The film thickness may be varied by adjusting the concentration of solids in the varnish or by adjusting the amount of the vanish to be applied to the substrate.

The following method and material may be used to form OLED elements with the conductive varnish of the present invention, although they are not limitative.

The first step is to clean the electrode substrates with detergent, alcohol, pure water, etc. The cleaned anode substrate should preferably undergo surface treatment (such as ozone treatment and oxygen-plasma treatment) immediately before its use. However, this surface treatment may be omitted if the anode substrate is composed mainly of organic substances.

The following method is suitable for production of an OLED element with the conductive varnish.

First, the conductive varnish is applied to the anode substrate to form a conductive thin film thereon. Then, the coated anode substrate is placed in a vacuum vapor deposition apparatus, and vapor deposition is carried out to form thereon sequentially a hole transport layer, an emitting layer, an electron transport layer, an electron injection layer, and a cathode metal. A carrier block layer may be formed optionally between any adjacent layers to control the emitting region. Thus there is obtained a desired OLED element.

The anode may be formed from a transparent electrode material, such as indium tin oxide (ITO) and indium zinc oxide (IZO), which should preferably be planalized. It may also be formed from a polythiophene derivative or polyaniline highly capable of charge transportation.

The hole transporting layer may be formed from any of the following compounds.

triarylamine, such as (triphenylamine) dimer derivative (TPD), (α-naphthyldiphenylamine) dimer (α-NPD), and [(triphenylamine) dimer] spirodimer (Spiro-TAD).

"Starburstamine", such as 4,4',4"-tris[3-methylphenyl(phenyl)amino]triphenylamine (m-MTDATA) and 4,4',4"-tris[1naphthyl(phenyl)amino]triphenylamine (1-TNATA).

oligothiophene, such as 5,5"-bis{4-[bis(4-methylphenyl)amino]phenyl}-2,2',5',2"-terthiophene (BMA-3T).

The emitting layer may be formed from any of tris(8-quinolinolate) aluminum (III) ($Alq_3$), bis(8-quinolinolate) zinc (II) ($Znq_2$), bis(2-methyl-8-quinolinolate)(p-phenylphenolate) aluminum (III) (BAlq), and 4,4'-bis(2,2-diphenylvinyl)biphenyl (DPVBi). The emitting layer may be formed by codeposition of the electron transporting material (or hole transporting material) and the emitting dopant.

Examples of the electron transporting material include $Alq_3$, BAlq, DPVBi, (2-(4-biphenyl)-5-(4-t-butylphenyl)-1,3,4-oxadiazole) (PBD), triazole derivative (TAZ), bathocuproine (BCP), and silole derivative.

Examples of the emitting dopant include quinacridone, rubrene, coumarin 540, 4-(dicyanomethylene)-2-methyl-6-(p-dimethylaminostyryl)-4H-pyran (DCM), tris(2-phenylpyridine) iridium (III) ($Ir(ppy)_3$), and (1,10-phenanthroline)-tris(4,4,4-trifluoro-1-(2-thienyl)-butane-1,3-dionate) europium (III) ($Eu(TTA)_3phen$).

The carrier blocking layer may be formed from any of PBD, TAZ, BCP, etc.

The electron injection layer may be formed from any of lithium oxide ($Li_2O$), magnesium oxide (MgO), alumina ($Al_2O_3$), lithium fluoride (LiF), magnesium fluoride ($MgF_2$), strontium fluoride ($SrF_2$), Liq, Li(acac), lithium acetate, lithium benzoate, etc.

The cathode may be formed from any of aluminum, magnesium-silver alloy, aluminum-lithium alloy, lithium, sodium, potassium, cesium, etc.

No specific restrictions are imposed on the method of preparing the PLED element with the charge transporting varnish of the present invention. Some examples of the method are shown below.

The PLED element containing the conductive thin film, which is formed from the conductive varnish of the present invention, may be obtained by forming the polymeric layer for emission and charge transportation, in place of vacuum deposition to form the hole transporting layer, emitting layer, electron transporting layer, and electron injection layer in production of the OLED element mentioned above. To be concrete, the conductive thin film is formed on the anode substrate from the conductive varnish by the above-mentioned method. Then, the polymeric layer for emission and charge transportation is formed on it. Finally, the cathode is formed by vapor deposition. In this way there is obtained the PLED element.

The polymeric layer for emission and charge transportation is formed in the following manner. The polymeric material for emission and charge transportation alone or together with the emission dopant is uniformly dissolved or dispersed in a solvent. The resulting solution is applied to the electrode substrate on which the conductive thin film has been formed. Finally, the thin film is obtained after solvent evaporation.

Examples of the polymer for emission and charge transportation include polyfluorene derivative, such as poly(9,9-dialkylfluorene) (PDAF), polyphenylenevinylene derivative, such as poly(2-methoxy-5-(2'-ethylhexoxy)-1,4-phenylenevinylene) (MEH-PPV), polythiophene derivative, such as poly(3-alkylthiophene) (PAT), and polyvinylcarbazole (PVCz).

Examples of the solvent include toluene, xylene, and chloroform. Dissolution or dispersion may be accomplished by stirring, stirring with heating, or ultrasonic dispersion.

The method for coating is not specifically restricted. Coating may be accomplished by dip coating, spin coating, transfer printing, roll coating, or brushing. Coating should preferably be accomplished under a stream of inert gas such as nitrogen and argon.

Solvent evaporation may be accomplished by heating with an oven or hot plate under an inert gas stream or in a vacuum.

EXAMPLES

The invention will be described in more detail with reference to the following examples, which are not intended to restrict the scope thereof.

Example 1

[Preparation of Phenyltetraaniline Varnish]

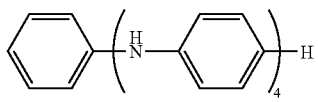

In 2 liters of toluene was dissolved 12.977 g of p-phenylenediamine. In the resulting solution was dissolved 245.05 g of tetra-n-butoxy titanium (which is a dehydration condensing agent) at 70° C. over 30 minutes. To the solution was added 53.346 g of p-hydroxydiphenylamine, and the solution was heated at 100° C. for 24 hours under a nitrogen atmosphere. After the reaction was complete, the reaction mixture was filtered and separated solids were washed sequentially with toluene and ether and finally dried. Thus there were obtained silvery crystals. The crystals, together with 0.2 mol of hydrazine monohydrate, were dissolved in as much dioxane as 25 times the weight of the crystals, by heating with refluxing, with the atmosphere in the reaction system replaced by nitrogen. To the resulting solution was added as much toluene as 25 times the weight of the crystals, so that the solution was suspended in toluene. The resulting suspension was heated with refluxing. As much dioxane as 10 times the weight of the crystals was added, and the crystals were dissolved by heating with refluxing. The resulting solution was filtered while it was still hot. The solids which had separated out from the filtrate were recrystallized, and the resulting crystals were washed sequentially with toluene-dioxane (1:1) and ether under a nitrogen atmosphere. The crystals were filtered off and dried at 60° C. for 10 hours under reduced pressure. The procedure for recrystallization was repeated again. Thus, there was obtained 39.60 g of white crystals. (yield: 75%)

The thus obtained white crystals were doped with 5-sulfosalicylic acid (as a dopant) under the condition shown in Table 1. The resulting product was dissolved in DMF to give the desired varnish.

TABLE 1

(Conditions for preparation of varnish)

| Run No. | Phenyltetraaniline (g) | Dopant (g) | Solvent DMF (g) | Concentration (wt %) |
|---|---|---|---|---|
| 1 | 1.00 | 0.574 | 29.91 | 5 |
| 2 | 1.00 | 1.148 | 40.81 | 5 |
| 3 | 1.00 | 1.723 | 51.74 | 5 |
| 4 | 1.00 | 2.297 | 62.64 | 5 |
| 5 | 7.50 | 17.23 | 89.16 | 20 |
| 6 | 15.0 | 34.47 | 66.87 | 40 |
| 7 | 15.0 | 34.47 | 21.20 | 70 |

The samples of conductive varnish shown in Table 1 remained stable during storage at 0° C. for 3 months under an atmosphere of nitrogen. The storage stability was proved by the fact that no aggregates were found after filtration.

The conductive varnish (8 g) designated as Run No. 4 in Table 1 was tested for time required to pass through a PTFE membrane filter, 25 mm in diameter, having a pore diameter of 0.2 μm. The results are shown in Table 2.

Comparative Example 1

A sample of conductive vanish (5 wt % concentration) was prepared under the same conditions as the conductive varnish designated as Run No. 4 in Table 1, except that the phenyltetraaniline was not reduced. This sample was tested for time required to pass through a PTFE membrane filter in the same way as in Example 1. The results are shown in Table 2.

TABLE 2

(Time required for passage through a filter)

|  | Time for passage |
|---|---|
| Example 1 | 15 seconds |
| Comparative Example 1 | 62 seconds |

It is apparent from Table 2 that the 5 wt % varnish without reduction in Comparative Example 1 contains undissolved particles.

Example 2

The conductive varnish designated as Run No. 4 in Table 1 was applied by spin coating to an ITO glass substrate which had undergone ozone cleaning for 40 minutes. The coated substrate was baked at 180° C. for 2 hours on a hot plate. Thus there was obtained a conductive thin film, 40 nm thick. The conductive thin film was observed under a confocal laser microscope, whose microphotograph is shown in FIG. 1.

Comparative Example 2

Figure 2:
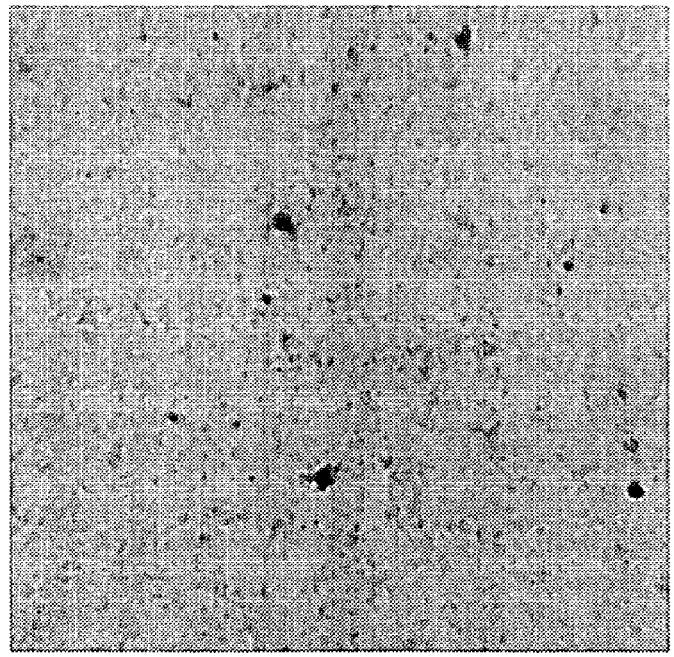
FIG. 2 is a confocal laser microphotograph (×20) of the coating surface obtained in Comparative Example 2.

A conductive thin film (40 nm thick) was obtained by the procedure mentioned in Example 2 from the varnish prepared by the procedure mentioned in Comparative Example 1. The conductive thin film was observed under a confocal laser microscope, whose microphotograph is shown in FIG. 2. Comparison between FIG. 1 and FIG. 2 indicates that the coating film is uneven due to undissolved particles.

Example 3

The conductive varnish designated as Run No. 4 in Table 1 was applied by spin coating to an ITO glass substrate which had undergone ozone cleaning for 40 minutes. The coated substrate was baked at 180° C. for 2 hours on a hot plate so as to form a hole injection layer (20 nm thick). The substrate was placed in a vacuum deposition apparatus, and vapor deposition was performed to form four layers sequentially as follows.

(α-naphthyldiphenylamine)dimer (α-NPD), 40 nm thick.
tris(8-quinolinolate aluminum (III)) ($Alq_3$), 60 nm thick.
LiF, 0.5 nm thick.
Al, 100 nm thick.

Figure 3:
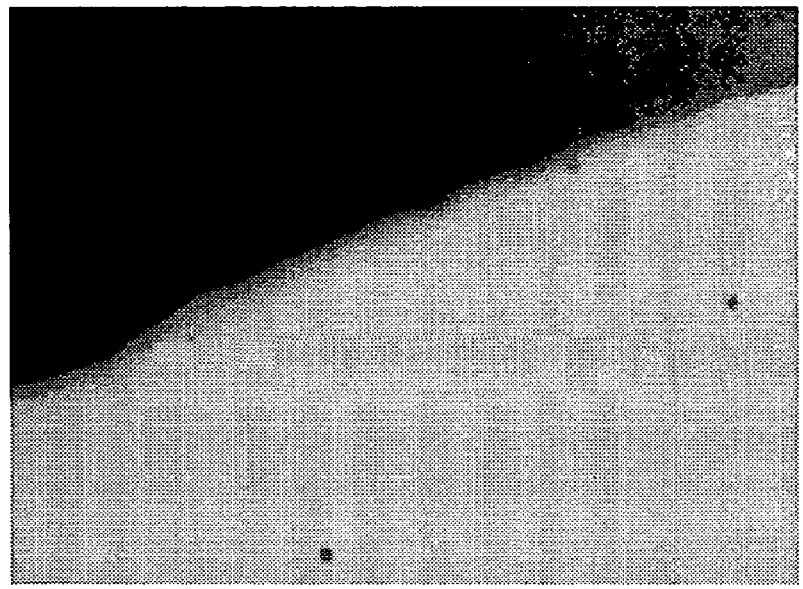
FIG. 3 is an optical microphotograph (×50) of the EL emitting surface obtained in Example 3. (What looks bright is the emitting surface.)

Vapor deposition for each layer was carried out at a pressure no higher than $8 \times 10^{-4}$ Pa. The rate of deposition was 0.3-0.4 nm/s (except for the LiF layer). The rate of deposition for the LiF layer was 0.02-0.04 nm/s. The substrate was transferred in a vacuum from one step to another. The thus obtained organic electroluminescence element has the characteristic properties as shown in Table 3. The photograph of the emitting surface is shown in FIG. 3.

Comparative Example 3

Figure 4:
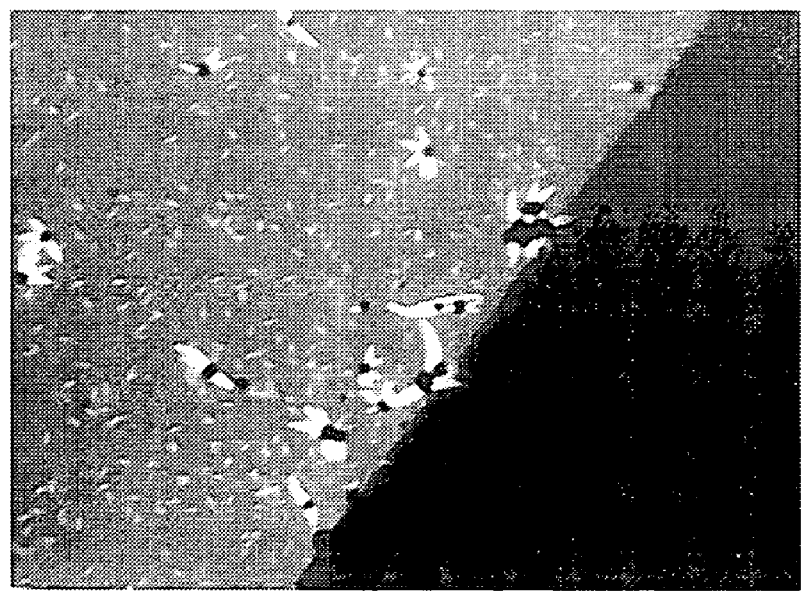
FIG. 4 is an optical microphotograph (×50) of the EL emitting surface obtained in Comparative Example 4. (What looks bright is the emitting surface.)

An organic EL element was prepared under the same conditions as in Example 3 from the conducive varnish mentioned in Comparative Example 1. The resulting organic EL element has the characteristic properties as shown in Table 3. The photograph of the emitting surface is shown in FIG. 4. It is apparent from Table 3 that the organic EL element according to the present invention has good characteristic properties. Comparison between FIG. 3 and FIG. 4 indicates that the organic EL element according to the present invention has a uniform emitting surface (FIG. 3).

TABLE 3

(Characteristic properties of organic EL elements)

| | Voltage (V) | Current density (mA/cm$^2$) | Luminance (cd/m$^2$) | Current efficiency (cd/A) |
|---|---|---|---|---|
| Example 3 | 8.0 | 0.090 | 28.6 | 3.92 |
| Example 3 | 10.0 | 0.729 | 199.1 | 4.20 |
| Comparative Example 3 | 8.0 | 2.32 | 1.0 | 1.11 |
| Comparative Example 3 | 10.0 | 4.74 | 95.3 | 4.11 |

Example 4

[Preparation of Phenylpentaaniline Varnish]

4,4'-diaminodiphenylamine (DADPA) was obtained from 4,4'-diaminodiphenylamine sulfate by recrystallization (for desalting) in an excess aqueous solution of sodium hydroxide. The thus obtained DADPA was reacted and purified in the same way as in Example 1 to give phenylpentaaniline. The phenylpentaaniline was dissolved in DMF and then doped with sulfosalicylic acid. Table 4 shows the amount of doping and the conditions for preparation of varnish.

TABLE 4

(Conditions for preparation of varnish)

| Run No. | Phenylpentaaniline (g) | Dopant (g) | Solvent DMF (g) | Concentration (wt %) |
|---|---|---|---|---|
| 1 | 1.00 | 0.476 | 28.04 | 5 |
| 2 | 1.00 | 1.953 | 37.11 | 5 |
| 3 | 1.00 | 2.429 | 46.15 | 5 |
| 4 | 1.00 | 2.905 | 55.20 | 5 |
| 5 | 1.00 | 3.381 | 64.24 | 5 |
| 6 | 1.00 | 3.381 | 17.52 | 20 |
| 7 | 1.00 | 3.381 | 6.57 | 40 |

The samples of conductive varnish shown in Table 4 remained stable during storage at 0° C. for 3 months under an atmosphere of nitrogen. The storage stability was proved by the fact that no aggregates were found in the filtration test carried out in the same way as in Example 1.

As shown in Examples mentioned above, the oligoaniline derivative according to the present invention is easy to synthesize, and it can be used as one of the raw materials to give a coating film having good heat resistance, high strength, good film properties, good antistatic properties, and weak tendency toward charge accumulation. The oligoaniline derivative in reduced form is readily soluble, and hence it is useful to give a conductive varnish heavily containing the organic conductive material of the present invention in which the oligoaniline derivative is used as a dopant. The conductive varnish can be used to form the charge injection auxiliary layer of the organic EL element, the organic electrode on a dielectric material of a capacitor, and the capacitor electrode, which broadly vary in thickness.

The invention claimed is:

1. An organic electroluminescence element having a conductive thin film formed from a conductive varnish comprising an organic conductive material which comprises a salt formed by an oligoaniline derivative represented by the formula (1) in which quinoimine as an oxidant formed at the time of synthesis of the oligoaniline derivative is reduced by a reducing agent, and an electron accepting dopant,

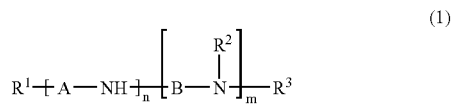
(1)

where R$^1$ and R$^2$ independently denote a hydrogen atom, unsubstituted or substituted monovalent hydrocarbon group, organoxy group, or acyl group, R$^3$ denotes a phenyl group; A and B independently denote a divalent group represented by the formula (2) or (3) below;

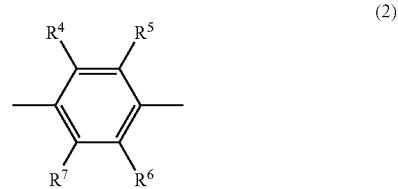
(2)

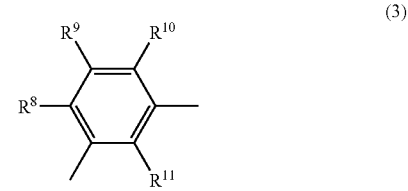
(3)

where, R$^4$ to R$^{11}$ independently denote a hydrogen atom, hydroxyl group, unsubstituted or substituted monovalent hydrocarbon group, organoxy group, acyl group, or sulfonic group; and m and n independently denote a positive number equal to or larger than 1 such that m+n≦20, and wherein the organic conductive material of the conductive varnish is in an amount of 1 to 80wt %.

2. The organic electroluminescence element as defined in claim 1, wherein R$^1$ and R$^2$ in the formula (1) denote a hydrogen atom, C$_{1-20}$ alkyl group, or C$_{1-20}$ alkoxy group.

3. The organic electroluminescence element as defined in claim 1, wherein the dopant is a sulfonic acid derivative represented by the formula (4)

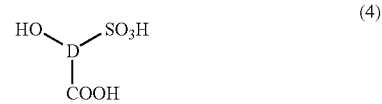
(4)

where D denotes a benzene ring, naphthalene ring, anthracene ring, phenanthrene ring, or heterocycle.

* * * * *